(12) United States Patent
Pihlaja

(10) Patent No.: US 7,023,428 B2
(45) Date of Patent: Apr. 4, 2006

(54) USING TOUCHSCREEN BY POINTING MEANS

(75) Inventor: Pekka Pihlaja, Helsinki (FI)

(73) Assignee: Nokia Corporation, Espoo (FI)

( * ) Notice: Subject to any disclaimer, the term of this patent is extended or adjusted under 35 U.S.C. 154(b) by 265 days.

(21) Appl. No.: 10/327,681

(22) Filed: Dec. 20, 2002

(65) Prior Publication Data

US 2003/0146905 A1 Aug. 7, 2003

(30) Foreign Application Priority Data

Dec. 20, 2001 (FI) ................................. 20012540

(51) Int. Cl.
G09G 5/08 (2006.01)

(52) U.S. Cl. .................. 345/173; 345/157; 345/169

(58) Field of Classification Search ........ 345/173–179, 345/156, 157, 162; 178/18.01, 18.1, 19.01
See application file for complete search history.

(56) References Cited

U.S. PATENT DOCUMENTS

| | | | |
|---|---|---|---|
| 5,686,937 A | 11/1997 | Li | |
| 5,736,974 A * | 4/1998 | Selker | 715/862 |
| 5,777,605 A * | 7/1998 | Yoshinobu et al. | 345/173 |
| 6,067,079 A | 5/2000 | Shieh | |
| 6,262,717 B1 * | 7/2001 | Donohue et al. | 345/173 |
| 6,278,443 B1 | 8/2001 | Amro et al. | |
| 6,757,002 B1 * | 6/2004 | Oross et al. | 715/864 |
| 2002/0008691 A1 * | 1/2002 | Hanajima et al. | 345/173 |
| 2002/0067346 A1 * | 6/2002 | Mouton | 345/173 |

FOREIGN PATENT DOCUMENTS

| | | |
|---|---|---|
| EP | 0653696 | 5/1995 |
| EP | 0795811 | 9/1997 |
| EP | 0813140 | 12/1997 |
| EP | 1191430 | 3/2002 |
| JP | 10-283115 | 10/1998 |
| NL | 1011842 | 12/2000 |
| WO | 0073889 | 12/2000 |

OTHER PUBLICATIONS

Patent Abstracts of Japan, Publication No. JP-10040010 (Feb. 13, 1998).
Patent Abstracts of Japan, Publication No. JP-2000267808 (Sep. 29, 2000).
A. Sears et al, Investigating touchscreen typing: the effect of keyboard size on typing speed, Jan.-Feb. 1993.
Patent Abstract of Japan, vol. 1999 01, Jan. 29, 1999 & JP 10 283115 Oct. 23, 1998.

* cited by examiner

Primary Examiner—Xiao Wu

(57) ABSTRACT

A method for selecting a function on a touchscreen. At least one element is displayed on the screen for providing a function. The function is arranged to be executed in response to activating the element. A cursor comprising a handle part and a pointing part is arranged to be shown on the screen. The handle part of the cursor is arranged substantially at a point on the screen indicated by a user such that the pointing part resides on the screen substantially at a different point than the indicated point. The element indicated by the pointing part is activated in response to the user selecting the element.

15 Claims, 3 Drawing Sheets

USING TOUCHSCREEN BY POINTING MEANS

FIELD OF THE INVENTION

The invention relates to using small, portable devices comprising a touchscreen by a pointing means, and particularly to using such a device single-handedly.

BACKGROUND OF THE INVENTION

The screens in computers used in public places, such as in ticket vending machines, are usually touchscreens. Selections are typically made using a finger as a pointing means. Such screens are large, so the buttons and other elements to be activated can also readily be large enough. Furthermore, applications often enable selections to be easily made between only a few alternatives, and usually no text, for example, needs to be entered either.

Touchscreens are often utilized in portable PDA (Personal Digital Assistant) devices that are becoming increasingly popular. Since most functions can also be implemented through keys modelled on a screen, a touchscreen substantially reduces the number of necessary mechanical keys. Consequently, such devices become smaller. Since the aim is to make the portable PDA devices as small as possible, the touchscreens used therein are also small. Furthermore, the functions of the applications in the devices are more versatile, and a screen can be provided with many elements to be selected. For example, the buttons of a qwerty keyboard can be modelled on a touchscreen in order to enable text to be entered. Since the screen is small and several elements to be selected are simultaneously displayed on the screen, the elements are substantially small. In addition to the modelled keys, another frequently used input mechanism is handwriting recognition. Thus, on account of the small keys and handwriting recognition, a touchscreen is often used by means of a small writing device, i.e. a stylus, such as a small pen-shaped object.

On many occasions it would be desirable to use a PDA device with one hand only. This is a problem when a touchscreen requires a stylus to be used as the pointing means. Using a stylus typically necessitates two hands; one for holding the device and the other for using the stylus to point at a desired point. It can be inconvenient and too time-consuming to extract a stylus from its storage slot in order to execute minor functions. Sometimes the small stylus may also be lost. In these situations, the user often eventually uses his or her finger as the pointing means. When the elements to be indicated are very small, e.g. on the touchscreens of the PDA devices, the surface area of a fingertip is, however, rather large with respect to these elements. A finger is an extremely inaccurate pointing means since it completely covers a target to be selected and important information around the target as well. In such a case, the user cannot be sure as to which elements he or she is pointing at.

In connection with large touchscreens, a solution is known wherein a user is able to determine the location of a pointer where the location of the pointer and the contact on the screen differ from each other (Offset). This solution enables the pointer to be removed from directly under the finger such that the user can more easily see what the pointer is currently pointing at. In the solution, the user is not shown in advance how the pointing means actually works. The user, according to a common practice, assumes that the cursor moves to the contact point since the user is not informed about the offset already setup in the device. The pointer moves to a different point than assumed and desired by the user, and this makes the device slower to use, or may result in pointing and selecting incorrect targets. Even after the user has realized how the pointing works, he or she must bear the extent of the offset in mind in order to be able to operate the device smoothly.

BRIEF DESCRIPTION OF THE INVENTION

An object of the invention is thus to provide a method and an apparatus implementing the method so as to enable the accuracy of pointing with a finger, for example, to be improved.

The idea underlying the invention is that a cursor (a virtual stylus), which comprises a handle part and a pointing part, is displayed on a touchscreen. When a user points to a screen by a pointing means, which can be a finger, for example, the handle part of the virtual stylus moves to the indicated point. The pointing part moves along with the handle part but is located at a substantially different point than the handle part such that the point indicated by the pointing part can be seen from under the pointing means. The pointing part shows on which point, on which element, for example, the activation of the virtual stylus is focused. After the user has made his or her selection, the element indicated by the pointing part is activated and the device executes the function associated with the element.

An element displayed on a screen may be a button, a key, or a text field, for example.

A function associated with an element is the operation executed by a device. Possible functions include starting an application, creating a new file, entering a selected letter into a text field and displaying such a letter on the screen or connecting a call to a desired number, for example. In practice almost all features and operations of a device can be functions.

An advantage of the method and device of the invention is that it also enables small elements to be selected on a touchscreen when a finger, for example, is used as a pointing means. This enables small devices to be used with one hand. An advantage of the virtual stylus of the invention is that the user, already before pointing, sees what the distance between the contact point and the indicated point will be. It is easier for the user to "anticipate" and select targets by placing the pointing means directly at a correct point with respect to the target to be selected without having to perform any readjustments in order to bring the pointing part onto the target. This makes the device faster to use and reduces the number of erroneously selected targets.

BRIEF DESCRIPTION OF THE DRAWINGS

The invention is now described in closer detail in connection with the preferred embodiments and with reference to the accompanying drawings, in which.

DETAILED DESCRIPTION OF THE INVENTION

Figure 1:
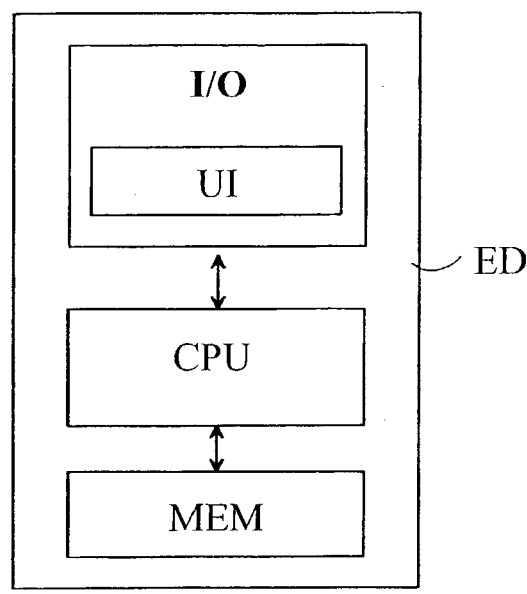
FIG. 1 is a block diagram showing an electronic device according to a preferred embodiment of the invention.

FIG. 1 is a block diagram showing an electronic device (ED), which can be a wireless mobile station or a PDA (Personal Digital Assistant) device, for example, according to a preferred embodiment of the invention.

The electronic device (ED) comprises a central processing unit (CPU), memory (MEM) and an input/output (I/O) system. All necessary information is stored in the memory (MEM) of the device. The memory (MEM) comprises a read-only memory part, which can be ROM memory, for example, and a read/write memory part, which may consist of RAM (Random Access Memory) and/or FLASH memory, for example. Through the I/O system (I/O), the device communicates with other devices, a network and a user, for example. A user interface (UI), which is part of the I/O system (I/O), comprises a necessary interface, such as a screen, keys, a loudspeaker and/or a microphone, for example, for communicating with the user. The screen of the device is a touchscreen. The information received from different components of the device is delivered to the central processing unit (CPU), which processes the received information in a desired manner.

The invention can be applied in connection with substantially all touchscreen types, but the touchscreen type used per se is irrelevant to the implementation of the invention. The implementation of a touchscreen may be based on one of the following techniques, for example: electrical methods, technology based on infrared light, technology based on sound waves or pressure recognition. Some touchscreen types require a stylus with integrated electronics, such as a resonance circuit. The operation of such a screen requires a stylus to be used, and the screen cannot be used by pointing with a finger, for example. Such a screen type also allows a virtual stylus to be used.

Figure 2:
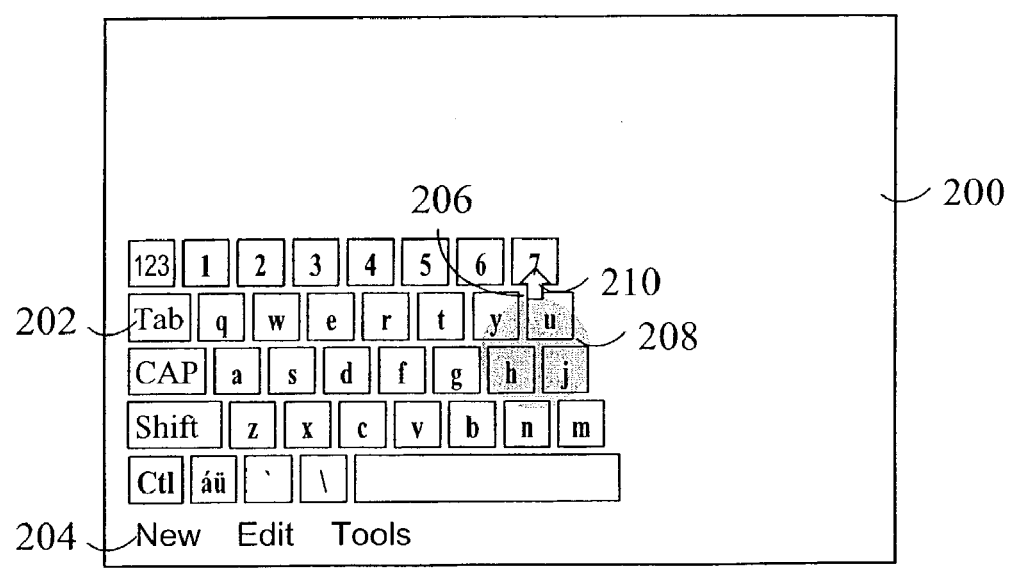
FIG. 2 shows a user interface according to a preferred embodiment of the invention.

FIG. 2 shows a user interface according to a preferred embodiment of the invention. The screen 200 is a touchscreen having some qwerty keyboard buttons 202 modelled therein and some function keys 204 provided at the bottom of the screen. By activating a letter key 202, i.e. by selecting it by a pointing means, the user is able to enter letters into the device and thus produce text. A virtual stylus 206 operating as a cursor comprises two parts. The grey area represents a handle part 208 of the virtual stylus 206, which designates the area onto which the pointing means, such as a finger, is placed. The user should also be able to see elements and other possible information underneath the handle part 208. According to a first preferred embodiment, the handle is partly transparent, as shown in the figure. According to a second preferred embodiment, the handle resembles a ring, in which case the area in the middle is shown in an ordinary manner. According to a third preferred embodiment, the handle part can be an inverse of the screen below, in which case the user is still allowed to see the information on the screen, only the colour changes.

An arrow-shaped pointing part 210 shows the exact location of the targeted point. When the user points to the screen 200 by the pointing means, such as a finger, the handle part 208 of the virtual stylus 206 moves to the contact point, i.e. underneath a finger, for example. Since the pointing part 210 is connected to the handle part 208, the pointing part 210 also moves along with the handle part 208. The shape, size, positioning and direction of the pointing part 210 with respect to the handle part 208 can be changed if necessary. When designing and positioning a pointing part 210, it is, among other things, advisable to take the screen properties, requirements set by application and purpose of use of a device into account. The user can also be provided with an opportunity to modify the properties of the pointing part 210. It may also be reasonable that the pointing part 210 changes also during use if thus required; for example, if the elements to be selected reside over the entire area of a touchscreen. In order to select the function keys 204 in the figure the pointing part 210 could, for example, be turned to point downwards as seen from the handle part 208. Alternatively, if the direction of the pointing part is not to be changed, the edges of the screen can be provided with status information, for example, which does not need to be pointed, or the touchscreen can be larger than the area in which the elements to be selected can reside.

The size of the handle part 208 may also have to be changed according to the size of a finger, for example. However, the handle part 208 should be large enough and the pointing part 210 should be placed so as to prevent the pointing part 210 from becoming entirely concealed by a pointing fingertip. In order to use the device single-handedly, the most natural pointing means would be the thumb. Of all fingers, the surface area of a thumb is the largest one, and this is also to be taken into account while modifying the size of the handle part 208. In addition, the handle part 208 and the pointing part 210 do not necessarily have to be adjoined with each other but they can also be located separately.

According to a preferred embodiment of the invention, the user is able to modify the above features of both the handle part 208 and the pointing part 210.

Figure 3:
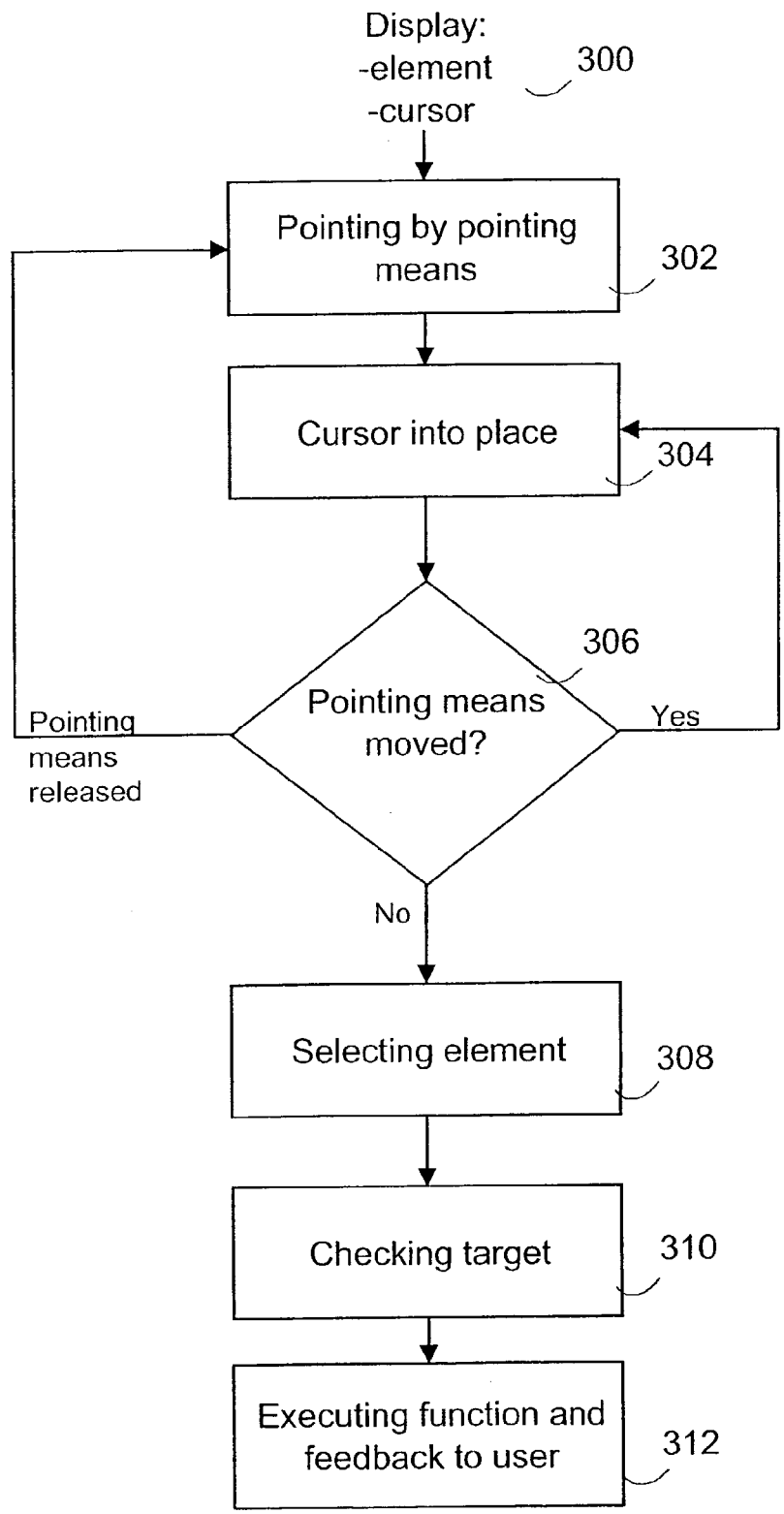
FIG. 3 is a flow diagram showing the operation of a virtual stylus according to a preferred embodiment of the invention.

FIG. 3 is a flow diagram showing the operation a virtual stylus according to a preferred embodiment of the invention. The touchscreen of a device identifies the intensity of a touch. A threshold value for touch intensity is stored in a memory. A touch stronger than the threshold value is interpreted as a strong touch and a touch lighter than the threshold value as a light touch. The touchscreen is provided with at least one element, such as a button, which can be selected by a user. The selection of a button results in a function associated with the particular button. In addition to the element, the screen displays a cursor, i.e. a virtual stylus, which comprises two parts: a handle part and a pointing part 300. The user uses a finger, for example, as a pointing means, placing it lightly (light touch) onto the screen 302. The screen detects the location and intensity of the touch, and the device moves the handle part of the virtual stylus to the point touched by the finger, i.e. underneath the finger 304. If the user moves his or her finger on the screen 306, the device detects this and updates the location of the stylus 304. If the finger is taken off the screen, the stylus remains in its place, at the point the user touched last, both the handle and the pointing part being visible. After the user has focused the pointing part of the virtual stylus on a desired target, on a button, for example, he or she may select an element 308 by pressing the screen harder (strong touch). After the user has selected the element 308, the device checks the target 310 and activates the element. Next, the device executes the function 312 associated with the element and if necessary, gives the user feedback on the selection and the possible function executed.

The technology in the most common screens does not, however, enable a screen to distinguish different touch intensities. The cursor can then be moved on the screen as described above but the actual selection, i.e. selecting an element 308, would, according to a preferred embodiment, take place when the user removes his or her finger from the screen. The technology in more advanced screens, in turn, enables the location of a fingertip to be identified already before the actual touch. In such a case, the virtual stylus could be moved by moving a finger close to the surface of the screen without touching it, however. An element would be selected 308 by actually touching the screen.

Figure 4:
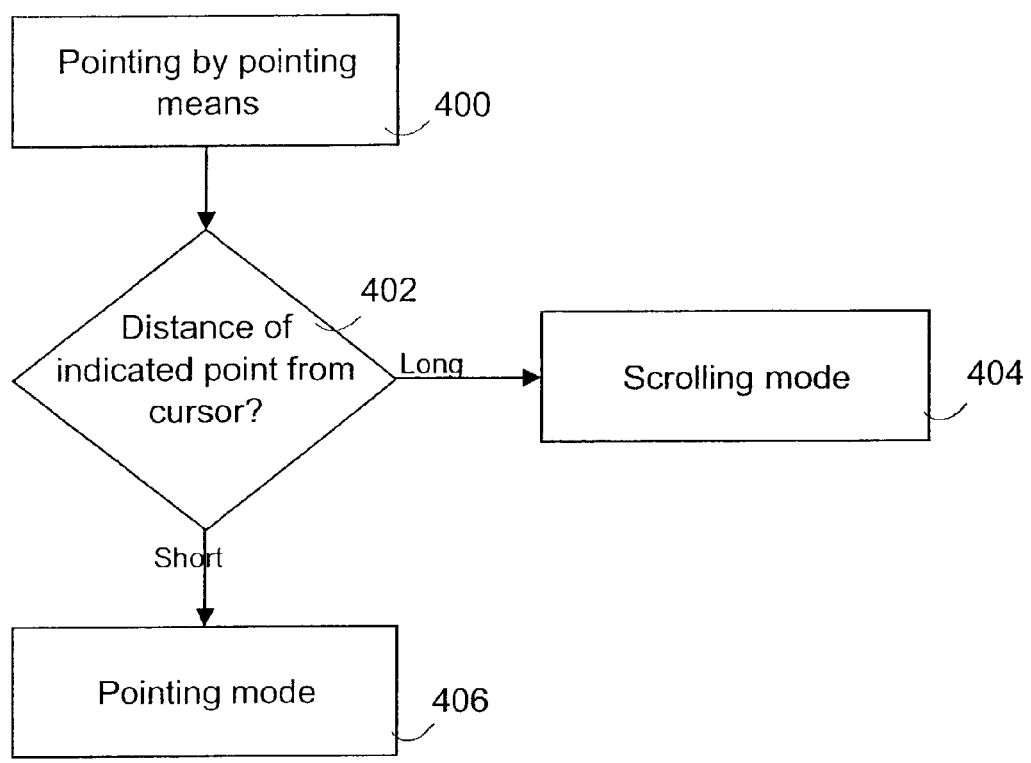
FIG. 4 is a flow diagram showing how the virtual stylus is used according to a preferred embodiment of the invention.

FIG. 4 is a flow diagram showing the operation of a virtual stylus according to a preferred embodiment of the invention. In some situations, the screen is incapable of displaying all desired information at once, for example while reading WWW pages or while processing an extensive text file. In such a case, it should be possible to scroll, two-dimensionally, the contents of a document being displayed on the screen. However, pointing and selecting elements should still be possible. When the user then points to the screen 400, the screen informs the central processing unit (CPU) about the pointing and its location. The central processing unit compares the received pointing location information with the previous location of the virtual stylus 402. If the distance from the stylus is longer than the predetermined threshold value stored in the memory (MEM), the device interprets that the user wishes to scroll the screen and select no element (scrolling mode) 404. If, again, the pointing takes place close to the virtual stylus, i.e. the distance is shorter than the threshold value, the device interprets that the user wishes to use the virtual stylus for selecting elements (pointing mode) 406. The virtual stylus is then moved underneath the finger, and the device operates as shown in FIG. 3.

When the device is in the scrolling mode 404, the user should also be able to slide his or her finger over the virtual stylus without the device interpreting that the user wishes to use the virtual stylus. If the user removes his or her finger from the screen during scrolling, a new contact point will be processed as described above and the mode in use will be selected according to this point. According to a preferred embodiment of the invention, when the device starts the scrolling mode the virtual stylus disappears from the screen and will not return until the finger is removed from the touchscreen. This gives the user clear feedback on the mode being currently used.

According to a preferred embodiment, the threshold value can be determined in such a manner that the pointing mode, herein the virtual stylus, is preferably activated when the user "grabs" the handle, i.e. when the point touched by the user at least partly resides within the area of the handle. This is intuitive, clearly giving the user feedback on the operation of the device. When the user touches an area outside the handle, the device starts another mode, such as the scrolling mode.

It is preferable to use the virtual stylus of the invention when several different modes are used. It will be evident to one skilled in the art that an alternative mode to the pointing mode does not necessarily have to be the scrolling mode according to the example described above but the invention can be applied in connection with other corresponding modes as well.

According to a preferred embodiment, when the user grabs the handle, more than one virtual stylus can be displayed on the screen simultaneously. This enables several different functions to be implemented in a preferred manner. The different operation of the styluses can preferably be indicated e.g. by shaping the pointing part differently. For instance, a screen can be provided with a stylus whose pointing part resembles a pen for drawing a line and another stylus whose pointing part resembles an eraser for erasing.

A screen may also support the use of several different pointing means, such as a pen-like stylus or a finger. In such a case, the device should recognize the method the user employs in a given situation. A way to distinguish a pointing means is to identify it by the contact area. The contact area of a finger is clearly larger than that of a pen, which means that the identification can be based on the size of a contact area. Alternatively, a device can identify whether or not a stylus resides in its storage slot. When the stylus resides in the slot, the device knows that a finger is used for selecting elements. On the other hand, when the stylus is removed from the slot, the device knows that the stylus is used. In addition to the methods mentioned above, the user may be provided with an opportunity to manually select which pointing means he or she wishes the device to assume to be used. This can be implemented e.g. using a setting menu or a mechanical key. Different methods may also be used together. When the pointing means is a finger, the virtual stylus of the invention can preferably be used. When the device assumes that a finger is used as the pointing means, a virtual stylus is shown on the screen. When, again, it is assumed that a stylus is used, no virtual stylus is shown. This gives the user clear feedback as to which pointing means the device assumes to be used. When contact area identification is used, the pointing means used last can be taken as a default.

It should be evident to one skilled in the art that as technology progresses, the basic idea of the invention can be implemented in many different ways. The invention and its embodiments are thus not restricted to the examples described above but they may vary within the scope of the claims.

What is claimed is:

1. A method for selecting a function on a touchscreen comprising at least one element for providing the function configured to be executed in response to activating said element, wherein a cursor comprising a handle part and a pointing part is arranged on the touchscreen, said pointing part and/or handle part is modifiable with respect to at least one of the following parameters:

a distance between a point indicated by the pointing part and the handle part, a direction of the point indicated with respect to the handle part, size of the handle part;

the method comprising:

arranging said handle part of the cursor substantially at a point on the touchscreen indicated by a user by a pointing means such that said pointing part resides on the touchscreen substantially at a different location than the point indicated, and activating the element indicated by the pointing part in response to the user selecting the element.

2. The method of claim 1, further comprising the steps of:

arranging a threshold value to be stored in a memory for a distance between a point indicated on the touchscreen and a previous location of the pointing part, comparing the distance between the point indicated on the touchscreen and the previous location of the pointing part with the threshold value, and activating a predetermined operation mode in response to a relation between said threshold value and the distance between the point indicated on the touchscreen and the previous location of the pointing part.

3. The method of claim 1, further comprising the step of:

displaying said handle part on the touchscreen such that it does not conceal other information on the touchscreen.

4. The method of claim 1, further comprising the steps of:
identifying said point indicated by the user by means of a touch of the pointing means on the touchscreen, and
selecting the element indicated by the pointing part in response to releasing the touch.

5. The method of claim 1, wherein
the touchscreen is configured to identify the intensity of a touch, whereby
said point indicated by the user is identified in response to touching the touchscreen substantially lightly, and
the element indicated by the pointing part is selected in response to a substantially more intense touch.

6. The method of claim 1, further comprising the steps of:
identifying said point indicated by the user by means of the pointing means residing substantially close to the surface of the touchscreen, and
selecting the element indicated by the pointing part in response to touching the touchscreen.

7. The method of claim 1, further comprising the steps of:
arranging a threshold value to be stored in a memory for a distance between a point indicated on the touchscreen and a previous location of the pointing part,
comparing the distance between the point indicated on the touchscreen and the previous location of the pointing part with the threshold value, and
selecting said element indicated by the pointing part in response to the distance between the point indicated on the touchscreen and the previous location of the pointing part being shorter than said threshold value, or
scrolling the touchscreen in response to the distance between the point indicated on the touchscreen and the previous location of the pointing part being longer than said threshold value.

8. An electronic device configured to display at least one element on a touchscreen in order to provide a function configured to be executed in response to activating said element, wherein
a cursor comprising a handle part and a pointing part is arranged on the touchscreen, said pointing part and/or handle part is configured to be modified with respect to at least one of the following parameters:
a distance between a point indicated by the pointing part and the handle part,
a direction of the indicated point with respect to the handle part,
size of the handle part;
said handle part of the cursor is configured to be adjusted substantially at a point on the touchscreen indicated by a user by a pointing means such that said pointing part resides on the screen substantially at a different location than the indicated point, and
the element indicated by the pointing part is activated in response to the user selecting the element.

9. The electronic device according to claim 8, wherein
the device is configured to store in a memory a threshold value for a distance between a point indicated on the touchscreen and a previous location of the pointing part,
the device is configured to compare the distance between the point indicated on the touchscreen and the previous location of the pointing part with the threshold value, and
a predetermined operation mode is activated in response to a relation between said threshold value and the distance between the point indicated on the touchscreen and the previous location of the pointing part.

10. The electronic device of claim 8, wherein
said handle part is configured for display on the touchscreen such that it does not conceal other information on the touchscreen.

11. The electronic device of claim 8, wherein
the device is configured to identify said point indicated by the user by means of a touch of the pointing means on the touchscreen, and
the device is configured to select the element in response to releasing the touch.

12. The electronic device of claim 8, wherein
the touchscreen is configured to identify the intensity of a touch, whereby
the device is configured to identify said point indicated by the user in response to touching the touchscreen substantially lightly, and
the device is configured to select the element in response to a substantially more intense touch.

13. The electronic device of claim 8, wherein
the device is configured to identify said point indicated by the user by the pointing means residing substantially close to the surface of the touchscreen, and
the device is configured to select the element in response to touching the touchscreen.

14. The electronic device of claim 8, wherein
the device is configured to store in a memory a threshold value for a distance between a point indicated on the touchscreen and a previous location of the pointing part, and
the device is configured to compare the distance between the point indicated on the touchscreen and the previous location of the pointing part with the threshold value, and
the device is configured to select the element indicated by the pointing part in response to the distance between the point indicated on the touchscreen and the previous location of the pointing part being shorter than said threshold value, or
the device is configured to scroll the touchscreen in response to the distance between the point indicated on the touchscreen and the previous location of the pointing part being longer than said threshold value.

15. The electronic device of claim 8, wherein
the handle part and the pointing part are substantially separate parts.

* * * * *

UNITED STATES PATENT AND TRADEMARK OFFICE
CERTIFICATE OF CORRECTION

| | | |
|---|---|---|
| PATENT NO. | : 7,023,428 B2 | Page 1 of 1 |
| APPLICATION NO. | : 10/327681 | |
| DATED | : April 4, 2006 | |
| INVENTOR(S) | : Pekka Pihlaja | |

It is certified that error appears in the above-identified patent and that said Letters Patent is hereby corrected as shown below:

On the front page under "Foreign Patent Documents" the following should be inserted:

--EP    0490001    6/1992--

Signed and Sealed this

Third Day of April, 2007

JON W. DUDAS
*Director of the United States Patent and Trademark Office*